United States Patent Office 3,576,916
Patented Apr. 27, 1971

---

3,576,916
ALICYLIC PHOSPHOROHYDRAZIDOTHIOATES
Leon Farber, Brooklyn, N.Y., assignor to
Tenneco Chemicals Inc.
No Drawing. Filed May 20, 1968, Ser. No. 730,612
Int. Cl. C07f *9/24*
U.S. Cl. 260—923                                    7 Claims

ABSTRACT OF THE DISCLOSURE

Alicyclic phosphorohydrazidothioates that are useful as insecticides have the structural formula

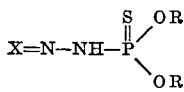

wherein each R represents an alkyl group having from 1 to 4 carbon atoms or a phenyl group and X represents a cycloalkylidene group having from 5 to 10 carbon atoms, a cycloalkylalkylidene group having from 5 to 10 carbon atoms, or a substituted cycloalkylidene group having as substituents one or more lower alkyl groups, carboxyl groups, or —CH$_2$SO$_3$H groups. Among the most active of these compounds as insecticides are O,O-diethyl camphor phosphorohydrazidothioate, O,O-diethyl menthone phosphorohydrazidothioate, and O,O-diethyl-3,3,5,5-tetramethylcyclohexylidene phosphorohydrazidothioate.

---

This invention relates to alicyclic phosphorohydrazidothioates and to a method for their production. It further relates to the control of insects using compositions that contain these alicyclic phosphorohydrazidothioates as their insecticidally-active component.

In accordance with this invention, it has been discovered that certain alicyclic phosphorohydrazidothioates are effective insecticides. These insecticidal compounds include cycloalkylidene phosphorohydrazidothioates and cycloalkylalkylidene phosphorohydrazidothioates that may be represented by the structural formula

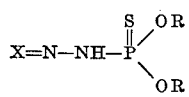

wherein each R represents an alkyl group having from 1 to 4 carbon atoms or a phenyl group and X represents a cycloalkylidene group having from 5 to 10 carbon atoms, a cycloalkylalkylidene group having from 5 to 10 carbon atoms, or a substituted cycloalkylidene or cycloalkylalkylidene group having as substituents one or more lower alkyl groups, carboxyl groups, or —CH$_2$SO$_3$H groups. Illustrative of these compounds are the following: O,O-dimethyl camphor phosphorohydrazidothioate, O,O-dibutyl fenchone phosphorohydrazidothioate, O,O-diethyl norcamphor phosphorohydrazidothioate, O,O-dimethyl 1-carvone phosphorohydrazidothioate, O,O-diphenyl 3-methyl cyclohexylidene phosphorohydrazidothioate, O,O-diphenyl cycloheptylidene phosphorohydrazidothioate, O,O-diphenyl camphor-α-sulfonic acid phosphorohydrazidothioate, and the like.

The alicylic phosphorohydrazidothioates of this invention may be prepared by any suitable and convenient procedure. For example, they may be prepared by reacting an O,O-dialkyl phosphorochloridothioate or O,O-diphenyl phosphorochloridothioate with hydrazine to form the corresponding phosphorohydrazidothioate (Equation 1) and reacting this intermediate with an alicylic ketone in the presence of a solvent, such as ethanol, at a temperature in the range of about 40° to 90° C. to form the alicyclic phosphorohydrazidothioate. A wide variety of alicyclic ketones may be used in this reaction. These include saturated monocyclic ketones, such as cyclohexanone; 3,3,5-trimethylcyclohexanone, and cyclopropyl methyl ketone; unsaturated monocyclic ketones, such as pulegone, piperitone, and carvone; dicyclic ketones, such as camphor, camphor-α-sulfonic acid, and fenchone; and tricyclic ketones, such as 8-ketotricyclo (5.2.1.0$^{2,6}$) decane. The reaction of a phosphorohydrazidothioate with cyclohexanone is shown in Equation 2 and with cyclopropyl methyl ketone is shown in Equation 3.

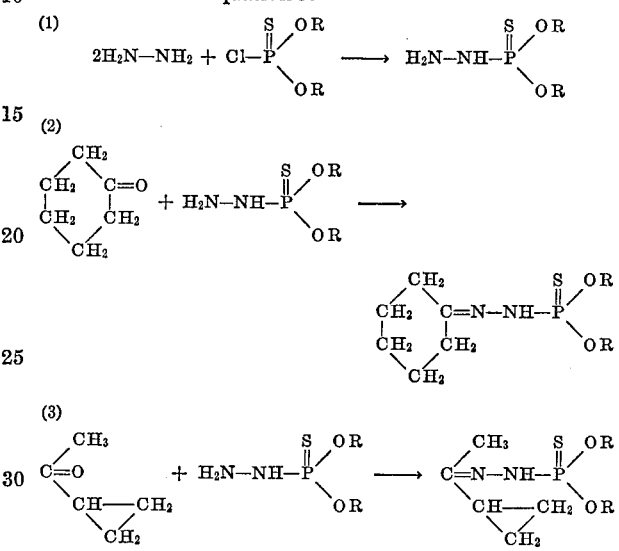

While the alicyclic phosphorohydrazidothioates may be used as such in the control of insects, they are usually and preferably used in combination with an inert carrier that facilitates the dispensing of dosage quantities of the insecticide and assists in its absorption by the insects. These compounds may be mixed with or deposited upon inert particulate solids, such as fullers earth, talc, diatomaceous earth, hydrated calcium silicate, kaolin, and the like, to form dry particulate compositions. Such compositions may, if desired, be dispersed in water with or without the aid of a surface-active agent. The insecticidal compounds are preferably dispensed in the form of solutions or dispersions in inert organic solvents or water or as oil-in-water emulsions. The concentration of the insecticide in the composition may be varied within wide limits and depends upon a number of factors, the most important of which are the insects being treated and the rate at which the composition is to be applied. In most cases the compositions contain about 0.1 percent to 85 percent by weight of one or more of the aforementioned alicyclic phosphorohydrazidothioates. If desired, the compositions may also contain other insecticides, such as chlordane, benzene hexachloride, and DDT; fungicides, such as sulfur and the metal dimethyl dithiocarbamates; or plant nutrients, such as urea, ammonium nitrate, and potash.

The insecticidal compositions of this invention can be used for controlling the growth of a wide variety of insects. The terms "insects" and "insecticide" are used herein in their broad common usage and include invertebrate animals belonging to the class Insecta as well as spiders, mites, nematodes, and the like.

The invention is further illustrated by the examples that follow.

EXAMPLES 1–22

A series of O,O-diethyl alicyclic phosphorohydrazidothioates was prepared by the following procedure: To 18.86 grams (0.1 mole) of O,O-diethyl phosphorochloridothioate in 20 ml. of toluene was added over a period of one hour 10 grams (0.2 mole) of hydrazine hydrate. The mixture was stirred and maintained at a temperature in the range of 0° to 5° C. throughout the addition. Stirring was continued at room temperature for an additional 3 hours. The reaction mixture was washed thoroughly with water and dried over magnesium sulfate. Upon removal of the toluene, O,O-diethyl phosphorohydrazidothioate was obtained.

To 0.05 mole of an alicyclic ketone in 250 ml. of ethanol was added 0.05 mole of O,O-diethyl phosphorohydrazidothioate. The mixture was stirred and maintained at about 70° C. for 5 hours. When the product formed was a solid, it was isolated by filtration and recrystallized from ethanol. When the product formed was an oil, it was isolated by heating the reaction mixture at 70° C. under reduced pressure to remove the ethanol and other volatile materials.

The compounds prepared and their analyses are set forth in Table I.

EXAMPLE 27

Aqueous solutions were prepared by dissolving 100 mg. portions of the compounds of Examples 1–26 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the alicyclic phosphorohydrazidothioate. More dilute solutions were prepared by adding distilled water to these solutions.

EXAMPLE 28

A series of experiments was carried out in which the compositions of Example 27 were applied to plants infested with Mexican bean beetles, Southern armyworms, aphids, houseflies, or 2-spotted spider mites at the rate of 1000 p.p.m. In no case was appreciable damage caused to the plant foliage. The degrees of control of the insects obtained are given in Table III.

TABLE I

Alicyclic Phosphorohydrazidothioates Having the Structural Formula $X=N-NH-P(=S)(OCH_2CH_3)(OCH_2CH_3)$

| | | Yield, percent | M.P., °C. | Analysis (calculated) | | |
|---|---|---|---|---|---|---|
| | Group represented by X | | | C | H | N |
| Example No.: | | | | | | |
| 1 | dl-Camphor residue | 75 | Oil | 50.89 (52.7) | 9.07 (8.55) | 9.25 (8.79) |
| 2 | Fenchone residue | 75 | Oil | 51.37 (52.7) | 7.75 (8.55) | 8.38 (8.79) |
| 3 | Methone residue | 85 | Oil | 55.45 (52.5) | 9.26 (9.11) | 8.60 (8.75) |
| 4 | Pulegone residue | 80 | Oil | 49.91 (52.7) | 7.37 (8.55) | 8.43 (8.79) |
| 5 | l-carvone residue | 77 | Oil | 53.23 (53.1) | 7.88 (7.96) | 8.57 (8.85) |
| 6 | Isomenthone residue | 81 | Oil | 52.9 (52.5) | 10.1 (9.11) | 8.22 (8.75) |
| 7 | Norcamphor residue | 55 | Oil | 47.17 (47.79) | 7.76 (7.66) | 9.69 (10.14) |
| 8 | d-10-camphorsulfonic acid residue | 60 | 215–220 (dec.) | 42.14 (42.19) | 6.85 (6.83) | 6.93 (7.02) |
| 9 | 8-ketotricyclo (5.2.1.0$^{2,6}$) decane residue | 75 | Oil | 53.1 (53.14) | 7.41 (7.96) | 8.18 (8.85) |
| 10 | Cyclopentylidene | 65 | 82.5–85.5 | 43.17 (43.18) | 8.21 (7.65) | 11.25 (11.19) |
| 11 | Cyclohexylidene | 60 | 47.5–52.0 | 45.56 (45.44) | 7.97 (8.00) | 10.60 (10.59) |
| 12 | 2-methylcyclohexylidene | 80 | Oil | 47.39 (47.45) | 7.43 (8.32) | 9.75 (10.06) |
| 13 | 3-methylcyclohexylidene | 63 | Oil | 47.18 (47.45) | 7.95 (8.32) | 9.52 (10.06) |
| 14 | 2,6-dimethylcyclohexylidene | 62 | 37–41 | 48.89 (49.29) | 8.23 (8.61) | 9.76 (9.57) |
| 15 | 3,5-dimethylcyclohexylidene | 65 | 57–58 | 49.83 (49.29) | 8.71 (8.61) | 10.08 (9.57) |
| 16 | 3,3,5-trimethylcyclohexylidene | 80 | 54–58 | 51.09 (52.0) | 9.35 (9.10) | 9.22 (9.30) |
| 17 | 3,3,5,5-tetramethylcyclohexylidene | 80 | Oil | 53.87 (52.3) | 9.49 (9.70) | 8.74 (8.70) |
| 18 | Cycloheptylidene | 74 | Oil | 48.18 (47.45) | 8.73 (8.32) | 10.14 (10.06) |
| 19 | Cyclohexane-1,3-dione residue | 68 | 135–137 | 46.94 (47.03) | 7.34 (7.56) | 9.00 (9.14) |
| 20 | 4-tert. butylcyclohexylidene | 85 | Oil | 53.07 (52.6) | 9.29 (9.13) | 8.75 (8.75) |
| 21 | 2-cyclohexyl-2-methylpropylidene | 65 | Oil | 53.52 (52.6) | 9.74 (9.13) | 8.58 (8.75) |
| 22 | Cyclopropylethylidene | 79 | Oil | 39.8 (43.3) | 7.86 (7.66) | 10.1 (11.2) |

EXAMPLES 23–26

A series of alicyclic phosphorohydrazidothioates was prepared by the procedure described in Examples 1–22, but using O,O-dipropyl phosphorochloridothioate or O,O-diphenyl phosphorochloridothioate in place of the diethyl compound.

The compounds prepared and their analyses are set forth in Table II.

TABLE III.—PERCENT CONTROL OF INSECT GROWTH WITH 1000 p.p.m. OF ALICYCLIC PHOSPHOROHYDRAZIDOTHIOATES

| Insecticide | Mexican bean beetles | Southern army worms | Aphids | Houseflies | 2-Spotted spider mites |
|---|---|---|---|---|---|
| Product of Ex. 1 | 100 | 10 | 18 | 90 | 79 |
| Product of Ex. 2 | 60 | 50 | 98 | 100 | 100 |
| Product of Ex. 3 | 80 | 40 | 98 | 100 | 100 |
| Product of Ex. 4 | 100 | 60 | 97 | 100 | 100 |
| Product of Ex. 5 | 100 | | 14 | 100 | 10 |

TABLE II

Alicyclic Phosphorohydrazidothioates Having the Structural Formula $X=N-NH-P(=S)(OR)(OR)$

| Ex. No. | Groups Represented by— | | Yield, percent | M.P., °C. | Analysis (calculated) | | |
|---|---|---|---|---|---|---|---|
| | X | Each R | | | C | H | N |
| 23 | Menthone residue | Propyl | 77 | Oil | 59.17 (55.1) | 9.78 (9.48) | 7.14 (8.04) |
| 24 | Pulegone residue | do | 80 | Oil | 55.64 (55.5) | 9.14 (9.09) | 7.08 (8.10) |
| 25 | Cyclopropylethylidene | do | 75 | Oil | 47.79 (42.5) | 8.61 (9.1) | 10.12 (11.0) |
| 26 | do | Phenyl | 85 | 107–112 | 62.91 (61.9) | 5.83 (5.80) | 8.78 (8.50) |

EXAMPLE 29

A series of experiments was carried out in which the compositions of Example 27 were applied at various concentrations to houseflies. The results obtained are summarized in Table IV.

TABLE IV.—PERCENT CONTROL OF HOUSEFLIES USING ALICYCLIC PHOSPHOROHYDRAZIDOTHIOATES

| Insecticide | Concentration, p.p.m. | Percent control |
|---|---|---|
| Product of Ex. 2 | 1,000 | 100 |
|  | 250 | 100 |
|  | 50 | 30 |
| Product of Ex. 3 | 1,000 | 100 |
|  | 250 | 100 |
|  | 50 | 30 |
| Product of Ex. 5 | 1,000 | 100 |
|  | 250 | 100 |
|  | 50 | 20 |
| Product of Ex. 6 | 1,000 | 100 |
|  | 250 | 100 |
|  | 50 | 40 |
| Product of Ex. 16 | 1,000 | 100 |
|  | 250 | 100 |
|  | 50 | 80 |
|  | 25 | 10 |
| Product of Ex. 17 | 1,000 | 100 |
|  | 250 | 100 |
|  | 50 | 95 |
|  | 25 | 15 |
| Product of Ex. 22 | 1,000 | 100 |
|  | 250 | 100 |
|  | 50 | 20 |

Each of the other compounds of this invention can also be used as the active component of insecticidal compositions.

The terms and expressions that have been employed are used as terms of description and not of limitation. There is no intention in the use of such terms and expressions of excluding any equivalents of the features shown and described or portions thereof. It is recognized that various modifications are possible within the scope of the invention claimed.

What is claimed is:
1. A compound having the structural formula

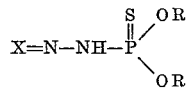

wherein each R represents a member selected from the group consisting of alkyl groups having from 1 to 4 carbon atoms and a phenyl group and X represents a member selected from the group consisting of cycloalkylidene groups, cycloalkylalkylidene groups, substituted cycloalkylidene groups, and substituted cycloalkylalkylidene groups, wherein the substituents on said alicyclic groups are lower alkyl groups, carboxyl groups, or —$CH_2SO_3H$ groups, said cycloalkylidene and cycloalkylalkylidene groups having from 5 to 10 carbon atoms.

2. A compound as set forth in claim 1 wherein each R represents an ethyl group and X represents a camphor residue.

3. A compound as set forth in claim 1 wherein each R represents an ethyl group and X represents a fenchone residue.

4. A compound as set forth in claim 1 wherein each R represents an ethyl group and X represents a menthone residue.

5. A compound as set forth in claim 1 wherein each R represents an ethyl group and X represents a 1-carvone residue.

6. A compound as set forth in claim 1 wherein each R represents an ethyl group and X represents a 3,3,5-trimethylcyclohexylidene group.

7. A compound as set forth in claim 1 wherein each R represents an ethyl group and X represents a cyclopropylethylidene group.

References Cited

UNITED STATES PATENTS 2,965,667  12/1960  Tolkmith _____ 260—923

FOREIGN PATENTS 11,013  1962  Japan _____ 260—293

CHARLES B. PARKER, Primary Examiner

R. L. RAYMOND, Assistant Examiner

U.S. Cl. X.R.

424—211

UNITED STATES PATENT OFFICE
CERTIFICATE OF CORRECTION

Patent No. 3,576,916  Dated April 27, 1971

Inventor(s) Leon Farber

It is certified that error appears in the above-identified patent and that said Letters Patent are hereby corrected as shown below:

Column 1, line 2, change "ALICYLIC" to -- ALICYCLIC --.

Column 1, line 69, change "alicylic" to -- alicyclic --.

Column 3, Table I, Example No. 3, change "Methone" to -- Menthone --.

Column 4, line 58, under "2-Spotted spider mites", change "79" to -- 70 --.

Signed and sealed this 24th day of August 1971.

(SEAL)
Attest:

EDWARD M. FLETCHER, JR.  WILLIAM E. SCHUYLER, JI
Attesting Officer  Commissioner of Patent: